United States Patent
Prasad et al.

(12) 
(10) Patent No.: US 6,237,026 B1
(45) Date of Patent: *May 22, 2001

(54) METHOD AND APPARATUS FOR AUTOMATIC ENROLLMENT OF A COMPUTER TO A CONFERENCE NETWORK OR THE LIKE

(75) Inventors: Rama R. Prasad, Portland; Rune A. Skarbo, Hillsboro, both of OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,604

(22) Filed: Dec. 31, 1997

(51) Int. Cl.[7] ........................................ G06F 13/00
(52) U.S. Cl. .................. 709/204; 709/101; 709/217; 709/227; 709/313
(58) Field of Search ..................... 709/200, 201, 709/202, 204, 205, 206, 207, 217, 227, 313, 328, 101

(56) References Cited

U.S. PATENT DOCUMENTS

| | | | |
|---|---|---|---|
| 5,440,624 | * 8/1995 | Schoof, II | 379/202 |
| 5,631,904 | * 5/1997 | Fitser et al. | 370/261 |
| 5,689,553 | * 11/1997 | Ahuja et al. | 379/202 |
| 5,729,684 | * 3/1998 | Kuzma | 709/204 |
| 5,828,743 | * 10/1998 | Pinnell et al. | 379/204 |
| 5,852,656 | * 12/1998 | Sato et al. | 379/93.21 |

* cited by examiner

*Primary Examiner*—Viet D. Vu
(74) *Attorney, Agent, or Firm*—Kenyon & Kenyon

(57) ABSTRACT

A method and apparatus is provided that allows an enrolling computer to automatically log-in to a network or enroll into a conference. The enrolling computer includes participant agent code that is executed which automatically communicates with a central computer executing enroller agent code to allow the enrolling computer to enroll in a conference without user action. For example, if a conference is set up with a radio frequency remote link, a laptop computer having a radio frequency remote link can automatically enroll into the conference through the execution of the participant agent code and the communication between a central computer and the enrolling computer via the radio frequency remote links.

15 Claims, 7 Drawing Sheets

METHOD AND APPARATUS FOR AUTOMATIC ENROLLMENT OF A COMPUTER TO A CONFERENCE NETWORK OR THE LIKE

BACKGROUND OF THE INVENTION

The present invention pertains to a method and apparatus for creating and conducting a conference (e.g., a personal computer (PC) based conference) between individual users. More particularly, the present invention pertains to a method and apparatus for scheduling conferences and for automatically enrolling conference attendees through a computer system or the like.

As is known in the art, a conference, such as a PC-based conference, allows two or more conference attendees to communicate over a network (e.g., telephone lines) with each other while sharing video images (e.g., images of attendee's faces). PC-based conferencing also allows attendees to share screen outputs of computer software programs (e.g., POWERPOINT® 4.0 presentation software, EXCEL® 4.0 spreadsheet software, and WORD 6.0 word-processing software, products of Microsoft Corporation, Redmond, Wash.). Accordingly, a first user can run a POWERPOINT® application at his/her computer and the screen output at the computer can be displayed at a video terminal or computer of a remote second user as long as the first user's computer and second user's video terminal/computer are communicating with each other. Moreover, attendees may be able to "share" a file (such as a word-processing file) such that each attendee can alter the file as attendees watch.

An example of a known conference system is the Intel TeamStation™ System from Intel Corporation. The Intel TeamStation™ System typically includes a Pentium® II processor-based central computer with built-in networking capability, a motorized camera, a full-duplex audio system, and a high-resolution multimedia monitor. Video conferencing software is executed at the central computer to facilitate the connecting of other PCs to the central computer as well as the conferencing connection to remote sites (e.g., over a network). The Intel TeamStation™ System is based, in part, on Intel's ProShare(t program that allows users of PCs to conduct video conferences while sharing documents displayed on each monitor.

The T.120 standard (International Telecommunications Union (ITU), 1995) is a standard for data conferencing applications. The Windows® 95 and Windows® NT operating systems (Microsoft Corporation, Redmond, Wash.) support the T.120 data conferencing standard and an application such as NetMeeting 2.0 (Microsoft Corporation) allows a user to connect his/her PC to other PCs that are running the NetMeeting software. In turn, Intel's ProShare® program can be integrated with the NetMeeting software to connect with other PCs over a Local Area Network (LAN) or Integrated Services Digital Network (ISDN) using the appropriate communications standard (e.g., the H.320 and H.323 standards, respectively, ITU, 1995).

To allow for the sharing of video output on a monitor (e.g., of a PC, laptop computer, etc.) among attendees of a conference, the computer must be properly connected to the network with which the attendees are a communicating. Examples of such networks include: Local Area Networks (LANs), Wide Area Networks (WANs), ISDN, Plain Old Telephone Service (POTS), wireless systems (e.g., radio frequency, cellular, infra-red), a combination of these systems, etc. This may require making physical connections between the computer and the network and executing appropriate software at the network (e.g., by a central computer) and/or the computer so as to become a part of the conference. For example, a potential conference attendee may need to dial into a multipoint conference control unit (MCU) using a POTS telephone number, and then physically cause software to be executed locally to complete the connection to the conference.

To make entry into a computer-based conference or network simpler, there is a need for a method and apparatus that allows a potential conference attendee to automatically enroll or join a conference or allows a computer to automatically log into a network. There is also a need for a method and apparatus that allows a computer system to keep track of conferences and scheduling to facilitate enrollment in conferences.

SUMMARY OF THE INVENTION

According to an embodiment of the present invention, in a conference system including a central computer running a conferencing application, an apparatus is provided to automatically enroll an enrolling computer into a conference including the central computer. The apparatus includes an enrolling computer having a processor adapted to execute participant agent code to communicate with the central computer to automatically enroll the enrolling computer into the conference.

DETAILED DESCRIPTION

Figures 1, 4:
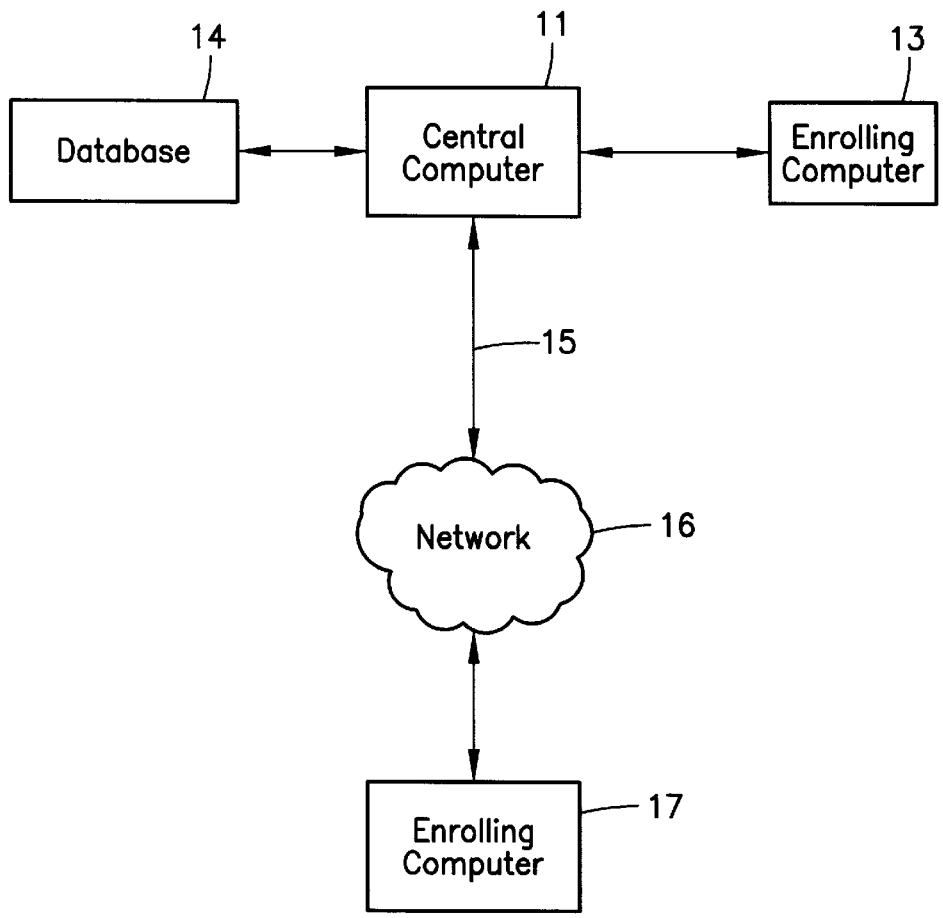
FIG. 1 is a block diagram of a conferencing or network system according to an embodiment of the present invention.
FIG. 4 is an example of a table entry of a database according to an embodiment of the present invention.

Referring to FIG. 1, block diagram of a conference system constructed and operating according to an embodiment of the present invention is shown. The conference system includes a central computer 11 such as a personal computer having a Pentium-II® processor. Central computer can communicate with enrolling computer 13, such as a lap-top or notebook computer including a Pentium-II® processor. Enrolling computer 13 can be coupled to central computer 11 directly or via a network. Conference computer 11 may be coupled to a database 14 which includes one or more memory devices such as Random Access Memory (RAM) or hard-disc drive(s). Central computer 11 can be further coupled to network 16 via a connection 15. For example, connection 15 can be a POTS line, an ISDN line, etc. and network 16 can be a telephone network, a LAN, etc. Additional computers can be coupled to central computer 11 or to network 16 as desired (e.g., a second enrolling computer 17). According to a first embodiment of the present invention, enrolling computer 13 can automatically enroll into a conference as described in further detail with respect to FIGS. 2 and 3. As used herein, the term "conference" refers to a communication system between computers allowing the sharing of data (e.g., video data, files, etc.).

Figure 2A:
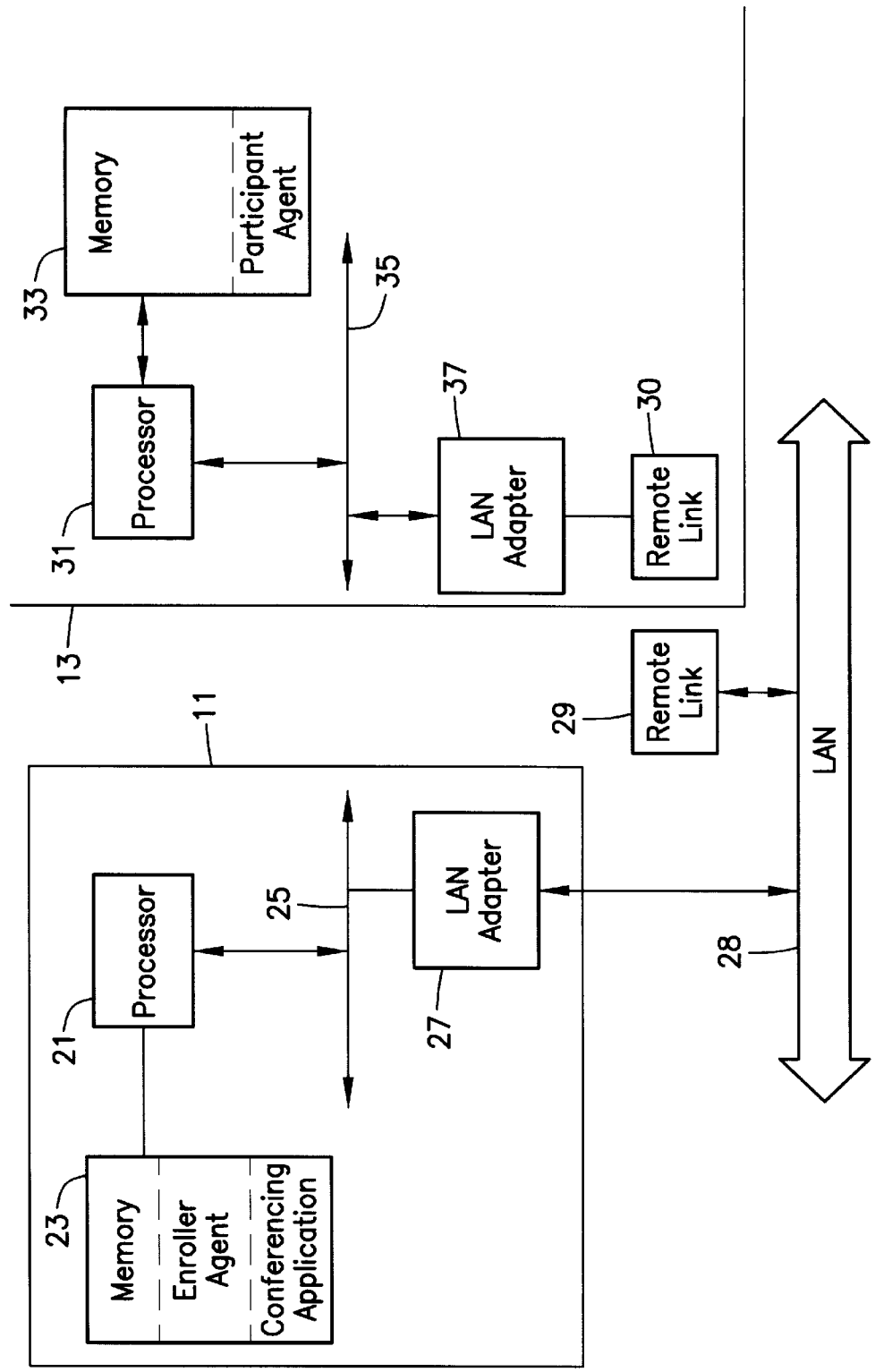
FIGS. 2A–B are block diagrams of examples of the conferencing or network system of FIG. 1.
Figure 2B:
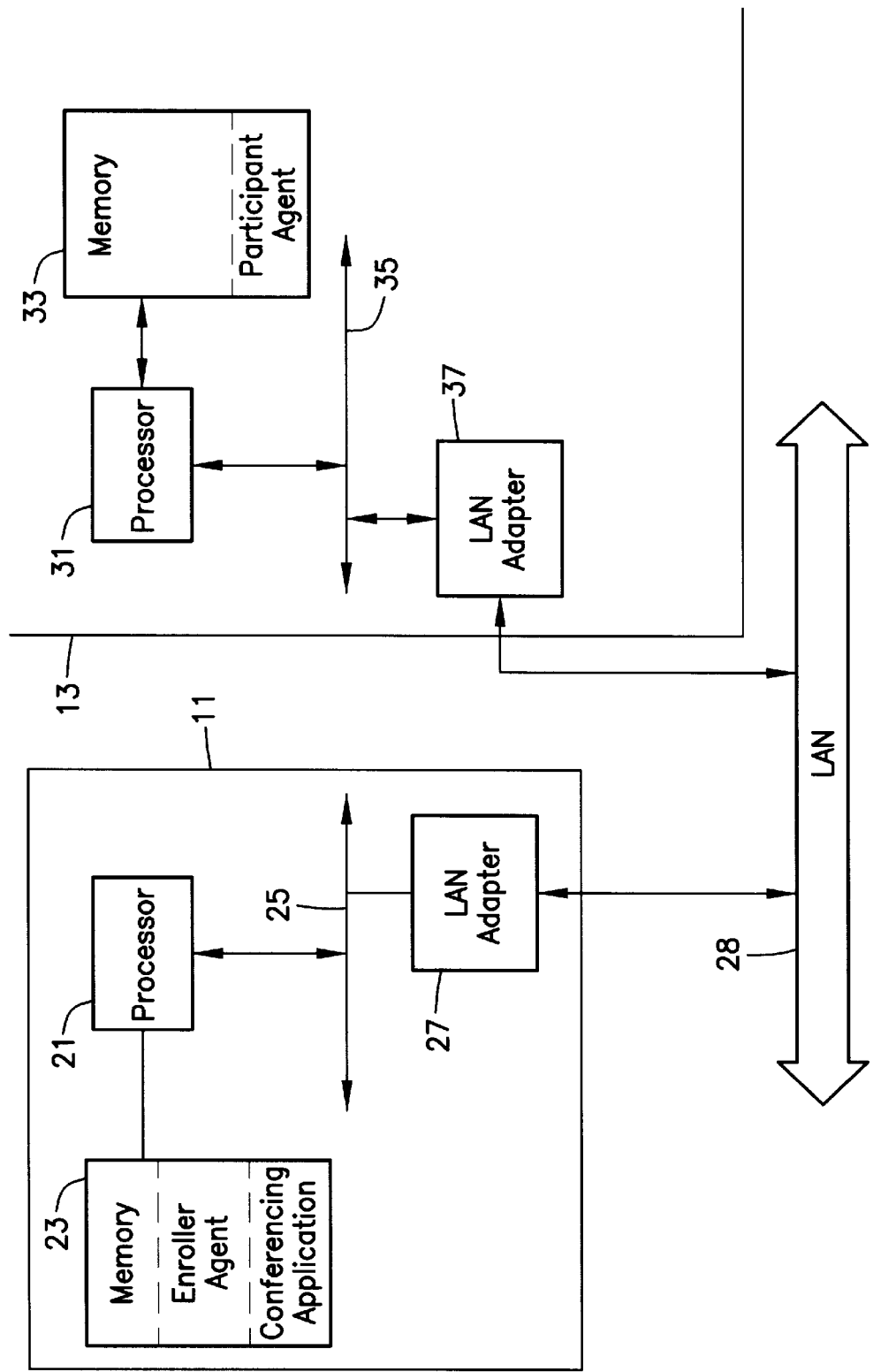

Referring to FIG. 2A, a block diagram of central computer 11, LAN 28 and enrolling computer 13 is shown. In the embodiment of FIG. 2A, central computer 11 includes a processor 21 coupled to a memory 23 (such as RAM) in which is stored a conferencing application and an enroller agent code. The conferencing application can be the NetMeeting 2.0 product from Microsoft Corporation which is designed to provide communication capabilities between computers in a conference environment. The enroller agent code will be described in more detail below. Processor 21 is coupled to bus 25 (e.g., a Peripheral Component Interconnect (PCI) bus, Rev. 2.1, PCI Special Interest Group, Hillsboro, Oreg., 1995). A LAN adapter 27 is coupled to bus 25 and in turn is coupled to LAN 28. Enrolling computer 13 can comprise, e.g., a processor 31 coupled to memory 33 and PCI bus 35, which in turn is coupled to LAN adapter 37. There are several methods of connecting enrolling computer 13 to LAN 28. In the example of FIG. 2A, a first remote link 29 is coupled to LAN 28, and a second remote link 30 is coupled to LAN adapter 37 of enrolling computer 13. The Noteworthy product from Toshiba America Information Systems, Inc. can be used to create this wireless communication between enrolling computer 13 and the network (e.g., LAN 28). In the Noteworthy product, a Noteworthy Wireless LAN PC Card with antenna (i.e., as second remote link 30) is inserted into a PC Card slot of enrolling computer 13 (PC Card interface; March 1997 release from PCMCIA— Personal Computer Memory Card International Association, Release 2.0, Sept. 1991) and communicates using radio frequency (RF) signals (e.g., at 2.4 Gigahertz) with a Noteworthy Access Point product (having its own antenna) coupled to LAN 28 (i.e., as first remote link 29). The wireless connection between enrolling computer 13 and LAN 28 can be maintained for a distance of up to 600 feet. Other examples of connections between enrolling computer 13 and LAN 28 would include physical connections which are known in the art and as shown in FIG. 2B) and other wireless connections known in the art such as those using infra-red technology or satellite technology. One skilled in the art will appreciate that central computer 11 or LAN 28 can be coupled to other conference attendees (e.g., through an additional network or networks).

Figure 3A:
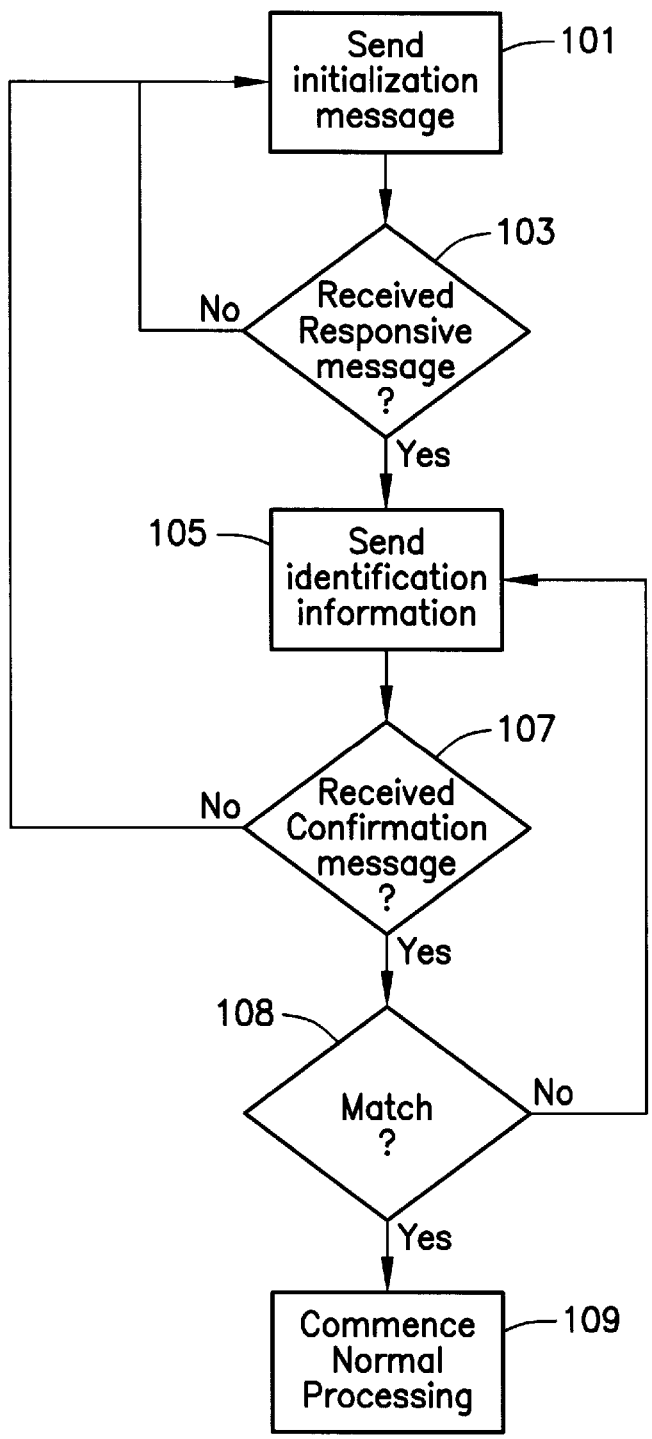
FIG. 3A is a flow diagram of the operation of an automatic network log-in or conference enrollment in an enrolling computer according to an embodiment of the present invention.

According to an embodiment of the present invention, computer 13 can be automatically coupled to LAN 28 through execution of participant agent code (e.g., stored in memory 33). Referring to FIG. 3A, a flowchart of the operation of an example of participant agent code in enrolling computer 13 is shown. In step 101, an initialization message is sent from computer 13 via second remote link 30 (FIG. 2). The initialization message may or may not be received at remote link 29, however if it is, an appropriate responsive message is sent from remote link 29 to second remote link 30. In decision block 103, it is determined whether a responsive message from remote link 29 has been received at second remote link 30. If the responsive message has not been received, then control passes back to step 101 to generate another initialization message (e.g., in a so-called "polling" manner). It may be disadvantageous to repeatedly send out initialization messages from computer 13. Accordingly, a delay may be included (e.g., every minute) so that the initialization attempt does not adversely impact on other applications running at computer 13. Also, a database may be included in enrolling computer 13 that stores a date and time for the start of a conference, allowing enrolling computer 13 to initiate a polling operation at that moment. Furthermore, the user could be given the ability to turn the polling operation on and off at enrolling computer 13.

If a responsive message is received by computer 13, control passes to step 105 where computer 13 sends identification information over second remote link 30 to remote link 29. In this example, identification information can include a user ID, identifying the user of computer 13, and a password. In a first embodiment, this identification information is used by computer 11 in conjunction with database 14 to automatically enroll computer 13 into a conference, such as a conference using an Intel TeamStation™ conferencing system or the Microsoft NetMeeting 2.0 product. In a second embodiment, this identification information is used by computer 11 in conjunction with database 14 to allow computer 13 to log into LAN 28.

If the identification information is determined by central computer 11 to match information in database 14 (e.g., as stated above), then a confirmation message is sent by computer 11 to enrolling computer 13 indicating that the enrolling computer is free to interact with LAN 28 as normal. In decision block 107, it is determined at enrolling computer 13 whether the confirmation message has been received or not. If it has not, then there may exist some form of error (e.g., the computer 13 has moved too far from network link 29) and control returns to step 101 where a new initialization message is sent from the enrolling computer to LAN 28. If the confirmation message is received at computer 13, then control passes to decision block 108 where it is determined whether a match has been found between the identification information at the enrolling computer 13 and the database 14. If there is no match then control passes back to block 105 to resend the identification message. If there is a match control passes to block 109 where communication continues as normal. For example, if enrolling computer 13 has logged into the LAN 28, then computer 13 can commence communication with LAN 28 to send electronic mail to other users coupled to LAN 28, access files stored in database 14, etc. If enrolling computer 13 is attempting to participate in a conference, then at this point enrolling computer communicates with LAN 28 and computer 11 as it would normally during such a conference (e.g., allowing images or files appear at enrolling computer 13, allowing images or files to be sent by enrolling computer 13 to other conference attendees). One skilled in the art will appreciate that the participant agent code can be modified to combine the initialization and identification messages into a single initialization message and receive only the confirmation message.

Figure 3B:
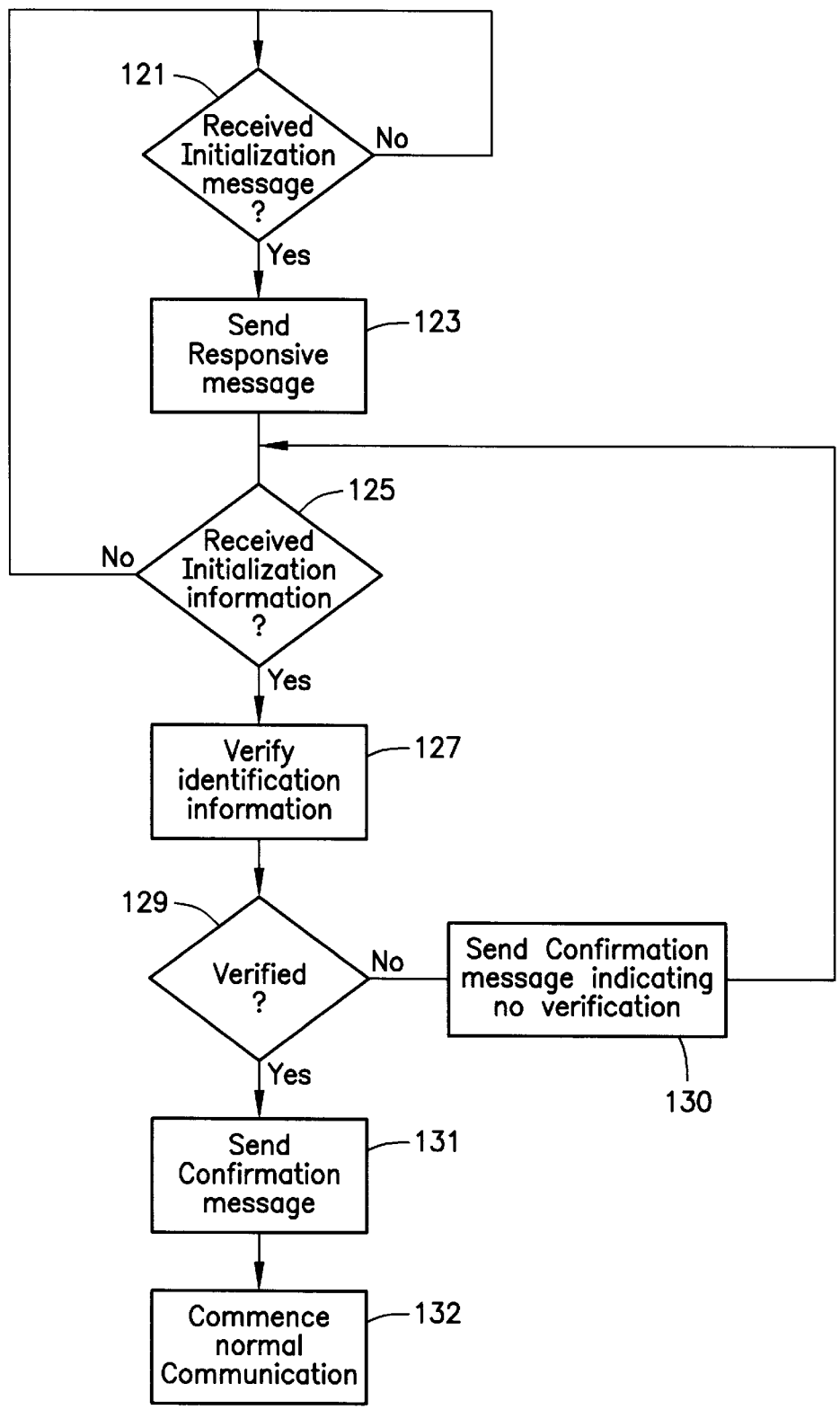
FIG. 3B is a flow diagram of the operation of an automatic network log-in or conference enrollment in a central computer according to an embodiment of the present invention.

In FIG. 3B, a flowchart is shown of an embodiment of the enroller agent code at central computer 11. In decision block 121, it is determined whether an initialization message has been received from enrolling computer 13. If it has not, then computer 11 continues to await the receipt of such an initialization message. As with enrolling computer 13, it may be advantageous to check for the initialization message periodically (i.e. after a set delay). Once an initialization message is received, control passes to block 123 where an appropriate responsive message is sent to enrolling computer 13, indicating that the initialization message has been received. In decision block 125, it is determined whether an identification message has been received from enrolling computer 13. If it has, then control passes to step 127 where the identification information is verified (e.g. compared to acceptable log-in IDs/passwords, a list of conference attendees, etc.). If the identification message has not been received from the enrolling computer, control passes to decision block 121 to await a new initialization message. In decision block 129, it is determined whether the identification information matches with an entry in database 14. If it does not, a confirmation message indicating no match is sent to enrolling computer 13 (step 130) and then waits to receive a new identification message 125. If there is a match, then control passes to step 131 where an appropriate confirmation message is sent to enrolling computer 13 to indicate that the log-in or conference enrollment is successful. Control then passes to step 132 where the standard communication between LAN 28 and enrolling computer 13 takes place. Again, one skilled in the art will appreciate that the responsive and confirmation messages can be combined into a single confirmation message, sent in response to an initialization message.

Using the system described in FIGS. 2A–B and 3A–B, an enrolling computer can be automatically logged into a network or enrolled into a conference without the user taking specific actions to do so.

In a further embodiment of the present invention, database 14 is a relational database that stores information detailing conferences that will include computer 11. An example of a table entry 70 for database 14 is shown in FIG. 4. In this example, table entry 70 includes a title/conference code field 71 which stores a text file or alphanumeric code indicating a title for the conference (e.g., "Project Status Conference"). Field 72 indicates a commencement time for the conference (e.g., a date and time). Field 73 indicates a conclusion time for the conference. Field 74 includes a description (e.g., in a text format) of the conference which can be conveyed to conference attendees. For example, field 74 may include the name of the convener or chairperson for the conference, an agenda for the conference, etc. Field 75 includes a list of conference attendees. In this example, the conference attendee identification (e.g., a phone number, a network address, etc.) and a password is included for each conference attendee. If desired, backup information can be provided for one or more conference attendees, such as an alternate telephone number or network address for the attendee.

Figure 5A:
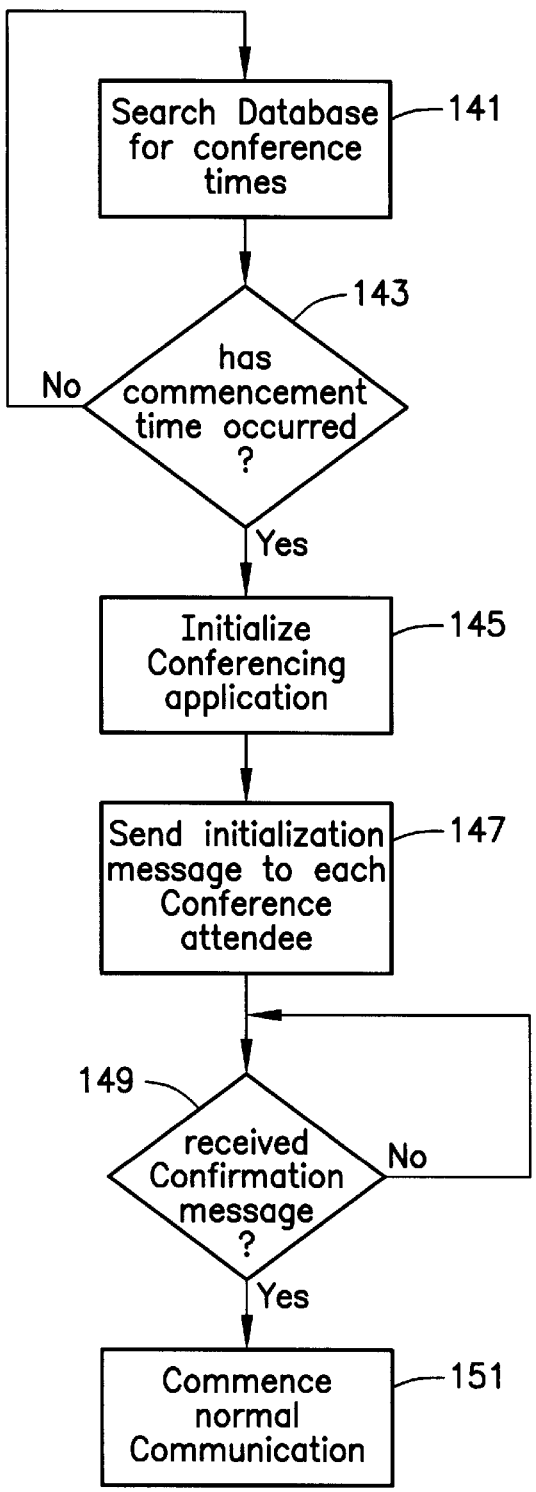
FIG. 5A is a flow diagram of the operation of a central computer to create a conference according to an embodiment of the present invention.

Using database 14 in such a manner provides for the creation of conferences with few actions that need to be taken directly by the conference attendees. Referring to FIG. 5A, a flowchart showing the operation of computer 11, in setting up such a conference is shown. In step 141, each table entry (e.g., table entry 70) is searched to determine whether the commencement time (e.g. in field 72) has been reached. If a conference commencement time has been reached (decision block 143), then control passes to block 145 where the conference application (e.g., the NetMeeting application referenced above) is initialized. Control then passes to step 147 where central computer 11 sends out an initialization message to each conference attendee. In the example of FIG. 3A, the initialization message would be sent to all computers coupled to LAN 28 as well as to remote computers such as enrolling computer 13 via first and second remote links 29 and 30. The initialization message would include an identifier for the conference attendee (e.g., a network address or other such identifier) and may include information such as the title of the conference as well as the commencement and conclusion times for the conference.

Conference attendees acknowledging receipt of the initialization message from central computer 11 will send a confirmation message facilitating the enrollment of that conference attendee into the conference. For example, upon receipt of the initialization message from computer 11, enrolling computer 13 can send identification information to central computer 11 indicating the title or conference code of the conference and an identification for the enrolling computer. In decision block 149, it is determined whether a confirmation message has been received from a conference attendee (and identification information, if sent by enrolling computer 13, can be verified as well). If a proper confirmation message has been received, control passes to step 151 where the central computer commences communication with the conference attendee under the execution of the conference application as set forth above. If a confirmation message is not received after a certain amount of time, control should be passed to step 141 (not shown specifically in FIG. 5A). The steps set forth in FIG. 5A should be repeated for each conference attendee.

Figure 5B:
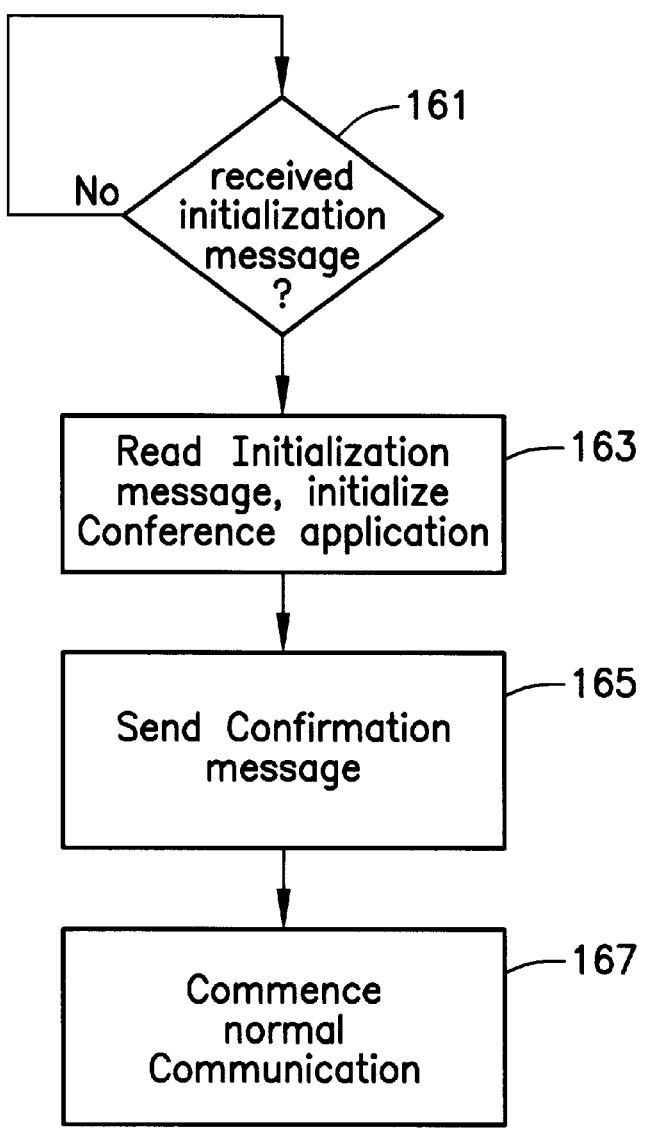
FIG. 5B is a flow diagram of the operation of an enrolling computer in response to the creation of a conference by the central computer according to an embodiment of the present invention.

Referring to FIG. 5B, a flowchart of an example of the operation of an enrolling computer is shown. In decision block 161, it is determined whether an initialization message has been received from central computer 11. If it has, then control passes to block 163 where the initialization message is read and a conference application (e.g., NetMeeting application) is initialized in conference attendee computer (e.g., enrolling computer 13). In step 165, a confirmation message is sent out to the central computer 11 and may include the title or conference code of the conference and an identification for the enrolling computer. At this point, the enrolling computer 13 is properly enrolled into the conference initiated at central computer and normal processing in conjunction with the conference then proceeds (step 167).

Using the database 14 in a manner as described in FIGS. 4 and 5A–B allows a conference to be set up and commenced without the active participation of the conference attendees. Doing so saves an appreciable amount of time and effort on behalf of the attendees, making the scheduling of conferences easier.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. In a conference system including a central computer running a conferencing application, an apparatus for automatic enrollment of an enrolling computer into a conference including said central computer comprising:

an enrolling computer including a processor adapted to execute participant agent code to communicate with said central computer to automatically enroll said enrolling computer into said conference via transmission of initialization messages in a polling manner from at least one of the central computer and the enrolling computer.

2. The apparatus of claim 1 where said conference system further includes a network coupled to said central computer and a first remote link coupled to said network, the apparatus further comprising:

a second remote link coupled to said enrolling computer, said enrolling computer adapted to communicate with said central computer to automatically enroll said enrolling computer into said conference via said first remote link and said network.

3. A network system comprising:

a central computer adapted to execute enroller agent code;

a network coupled to said central computer;

a first remote link coupled to said network;

a second remote link; and an enrolling computer coupled to said second remote link, said enrolling computer adapted to execute participant agent code and to communicate with said central computer to automatically log-in said enrolling computer to said network by transmitting initialization messages in a polling manner from at least one of the central computer and the enrolling computer.

4. The network system of claim 3 wherein said first and second remote links communicate via radio frequency signals.

5. The network system of claim 3 wherein said first and second remote links communicate via infra-red frequency signals.

6. A network system comprising:

a central computer adapted to execute enroller agent code;

a network coupled to said central computer; and an enrolling computer coupled to said network, said enrolling computer adapted to execute participant agent code and to communicate with said central computer to automatically log-in said enrolling computer to said network by transmitting initialization messages in a polling manner to said central computer.

7. A conference system comprising:

a central computer adapted to execute a conferencing application and enroller agent code;

an enrolling computer including a processor adapted to execute participant agent code to communicate with said central computer to automatically enroll said enrolling computer into said conference by transmitting initialization messages in a polling manner from at least one of said central computer and said enrolling computer.

8. The conference system of claim 7 further comprising:

a network coupled to said central computer;

said enrolling computer adapted to communicate with said network and said central computer while automatically enrolling said enrolling computer into said conference.

9. The conference system of claim 7 further comprising:

a first remote link coupled to said network; and a second remote link coupled to said enrolling computer, said enrolling computer adapted to communicate wirelessly with said network and said central computer via said first and second remote links.

10. The conference system of claim 9 wherein said first and second remote links communicate via radio frequency signals.

11. The conference system of claim 9 wherein said first and second remote links communicate via infra-red frequency signals.

12. The conference system of claim 8 wherein said enrolling computer is coupled to said network.

13. A conference system comprising:

a central computer adapted to execute a conference application;

a database coupled to said central computer and storing at least one table entry, said table entry including a commencement time for a conference and identification of at least one attendee of said conference; and said central computer, based on contents of said database, is adapted to execute enroller agent code to communicate with an enrolling computer executing participant agent code to automatically enroll said enrolling computer into said conference by transmitting an initialization message to said enrolling computer.

14. In a conference system including a central computer and an enrolling computer, a method for automatic enrollment of the an enrolling computer into a conference comprising:

executing a conference application at the central computer;

executing enroller agent code at said central computer;

executing participant agent code at an enrolling computer; and communicating between said enrolling computer executing participant agent code and said central computer executing enroller agent code to automatically enroll said enrolling computer into said conference by transmitting initialization messages in a polling manner to said central computer.

15. The method of claim 14 wherein said communicating step further comprises:

receiving at least one of said initialization messages from said enrolling computer at said central computer executing enroller agent code;

transmitting a confirmation message from said central computer executing enrolling agent code to said enrolling computer; and receiving said confirmation message from said central computer at said enrolling computer executing participant agent code.

* * * * *

UNITED STATES PATENT AND TRADEMARK OFFICE
CERTIFICATE OF CORRECTION

PATENT NO.   : 6,237,026 B1
DATED        : May 22, 2001
INVENTOR(S)  : Rama R. Prasad and Rune A. Skarbo It is certified that error appears in the above-identified patent and that said Letters Patent is hereby corrected as shown below:

<u>Column 1,</u>
Line 42, "(t" should be -- ® --
Line 61, "are a communicating" should be -- are communicating --

<u>Column 8,</u>
Line 25, "the an enrolling" should be -- the enrolling --

Signed and Sealed this

Sixteenth Day of April, 2002

Attest:

JAMES E. ROGAN
Attesting Officer            Director of the United States Patent and Trademark Office